United States Patent
Lee

(10) Patent No.: US 10,477,486 B2
(45) Date of Patent: Nov. 12, 2019

(54) DEVICE AND METHOD OF HANDLING UPLINK POWER CONTROL

(71) Applicant: ACER INCORPORATED, New Taipei (TW)

(72) Inventor: Chien-Min Lee, New Taipei (TW)

(73) Assignee: ACER INCORPORATED, New Taipei (TW)

(*) Notice: Subject to any disclaimer, the term of this patent is extended or adjusted under 35 U.S.C. 154(b) by 0 days.

(21) Appl. No.: 16/299,153

(22) Filed: Mar. 12, 2019

(65) Prior Publication Data

US 2019/0215778 A1   Jul. 11, 2019

Related U.S. Application Data

(63) Continuation of application No. 15/216,668, filed on Jul. 21, 2016, now Pat. No. 10,215,132.

(Continued)

(51) Int. Cl.
| | |
|---|---|
| *H04W 52/14* | (2009.01) |
| *H04L 5/00* | (2006.01) |
| *H04L 27/00* | (2006.01) |
| *H04W 74/00* | (2009.01) |
| *H04W 74/08* | (2009.01) |

(52) U.S. Cl.
CPC ......... *H04W 52/146* (2013.01); *H04L 5/0051* (2013.01); *H04L 5/0053* (2013.01);
(Continued)

(58) Field of Classification Search
CPC . H04L 27/0006; H04L 5/0051; H04L 5/0053; H04L 5/0091; H04W 52/146;
(Continued)

(56) References Cited

U.S. PATENT DOCUMENTS

2013/0315114 A1* 11/2013 Seo .................. H04L 5/001
                                                         370/280
2014/0056271 A1*  2/2014 Ahn ................ H04W 52/146
                                                         370/329
(Continued)

OTHER PUBLICATIONS

LG Electronics, DL/UL solutions of LAA with LBT, 3GPP TSG RAN WG1 Meeting #80, Feb. 9-13, 2015, R1-150214, XP050933428, Athens, Greece.
(Continued)

*Primary Examiner* — Lewis G West
(74) *Attorney, Agent, or Firm* — Winston Hsu

(57) ABSTRACT

A communication device is configured to execute instructions of determining that a first uplink (UL) transmission on a first serving cell of a network and a second UL transmission on a second serving cell of the network are overlapped; keeping a transmission power level of the first UL transmission and adjusting a first transmission power level of the second UL transmission to a second transmission power level of the second UL transmission, according to a power level limit of the communication device, if a sum of the transmission power level of the first UL transmission and the first transmission power level of the second UL transmission is greater than the power level limit; performing the first UL transmission according to the transmission power level of the first UL transmission; and performing the second UL transmission according to the second transmission power level of the second UL transmission.

20 Claims, 15 Drawing Sheets

Related U.S. Application Data

(60) Provisional application No. 62/195,805, filed on Jul. 23, 2015.

(52) U.S. Cl.
CPC ....... *H04L 27/0006* (2013.01); *H04W 74/004* (2013.01); *H04W 74/0816* (2013.01); *H04W 74/0833* (2013.01); *H04L 5/0091* (2013.01)

(58) Field of Classification Search
CPC .......... H04W 74/004; H04W 74/0816; H04W 74/0833
See application file for complete search history.

(56) References Cited

U.S. PATENT DOCUMENTS

| | | | | |
|---|---|---|---|---|
| 2014/0119302 | A1* | 5/2014 | Ahn | H04L 5/0051 370/329 |
| 2015/0036566 | A1* | 2/2015 | Blankenship | H04W 52/281 370/311 |
| 2015/0085797 | A1* | 3/2015 | Ji | H04J 3/16 370/329 |
| 2015/0181546 | A1* | 6/2015 | Freda | H04W 56/0015 370/336 |
| 2015/0181589 | A1 | 6/2015 | Luo | |
| 2016/0183195 | A1* | 6/2016 | Gao | H04W 52/146 455/522 |
| 2016/0212712 | A1* | 7/2016 | Chen | H04W 52/346 |
| 2016/0278050 | A1* | 9/2016 | Nory | H04W 16/14 |
| 2017/0013565 | A1* | 1/2017 | Pelletier | H04W 52/146 |
| 2017/0223640 | A1* | 8/2017 | Dinan | H04W 72/0473 |

OTHER PUBLICATIONS

Intel Corporation, Uplink transmission with LBT, 3GPP TSG-RAN WG2 #89bis, R2-151102, Apr. 20-24, 2015, Bratislava, Slovakia.

* cited by examiner

DEVICE AND METHOD OF HANDLING UPLINK POWER CONTROL

CROSS REFERENCE TO RELATED APPLICATIONS

This is a continuation application of U.S. application Ser. No. 15/216,668 filed on Jul. 21, 2016, which claims the benefit of U.S. Provisional Application No. 62/195,805, filed on Jul. 23, 2015.

BACKGROUND OF THE INVENTION

1. Field of the Invention

The present invention relates to a communication device and a method used in a wireless communication system, and more particularly, to a communication device and a method of handling uplink power control in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE (e.g., LTE-A Pro), etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to an unlicensed serving cell, to ease load of the network traffic. For example, the eNB may provide services to the UE via both a licensed serving cell and the unlicensed serving cell. Alternatively, the services are provided by eNBs to the UE via both the licensed serving cell and the unlicensed serving cell. However, a total power level for performing simultaneous transmissions of signals on the licensed serving cell and the unlicensed serving cell may be greater than a power level limit of the UE. Accordingly, the signals may not be transmitted completely, and benefit of the unlicensed serving cell is reduced. Thus, UL power control is an important problem to be solved.

SUMMARY OF THE INVENTION

The present invention therefore provides a method and related communication device for handling uplink power control to solve the abovementioned problem.

A communication device of handling uplink (UL) power control comprises a storage unit; and a processing means, coupled to the storage unit. The storage unit stores instructions, and the processing means is configured to execute the instructions of determining that a first UL transmission on a first serving cell of a network and a second UL transmission on a second serving cell of the network are overlapped; keeping a transmission power level of the first UL transmission and adjusting a first transmission power level of the second UL transmission to a second transmission power level of the second UL transmission, according to a power level limit of the communication device, if a sum of the transmission power level of the first UL transmission and the first transmission power level of the second UL transmission is greater than the power level limit; performing the first UL transmission according to the transmission power level of the first UL transmission; and performing the second UL transmission according to the second transmission power level of the second UL transmission.

A method of handling uplink (UL) power control, comprises steps of: determining that a first UL transmission on a first serving cell of a network and a second UL transmission on a second serving cell of the network are overlapped; keeping a transmission power level of the first UL transmission and adjusting a first transmission power level of the second UL transmission to a second transmission power level of the second UL transmission, according to a power level limit of a communication device, if a sum of the transmission power level of the first UL transmission and the first transmission power level of the second UL transmission is greater than the power level limit; performing the first UL transmission according to the transmission power level of the first UL transmission; and performing the second UL transmission according to the second transmission power level of the second UL transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
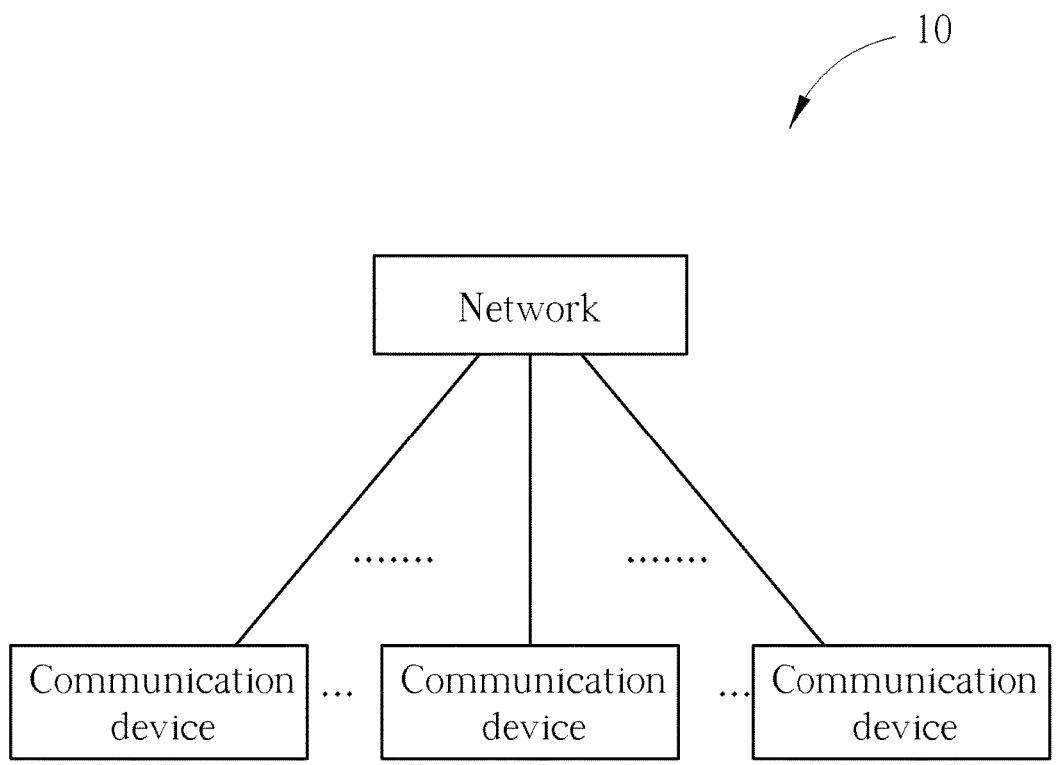
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
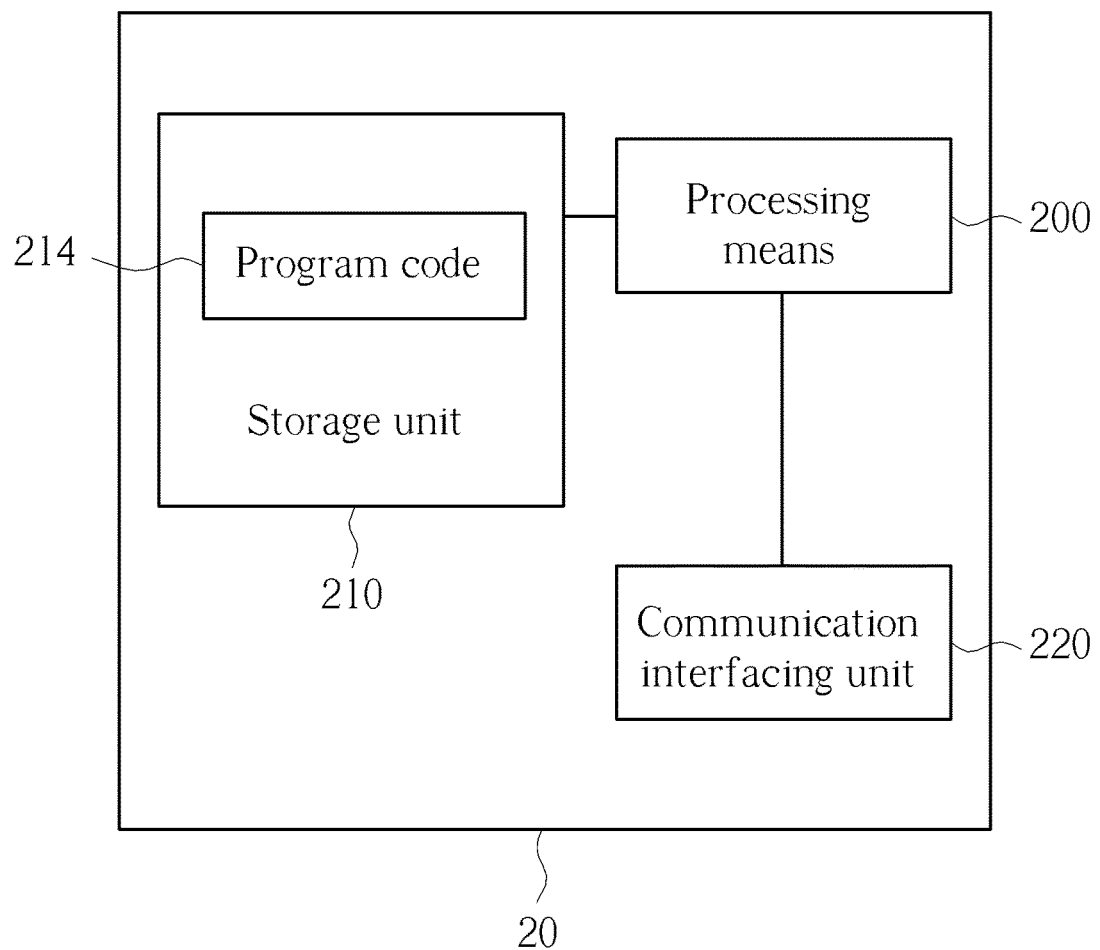
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
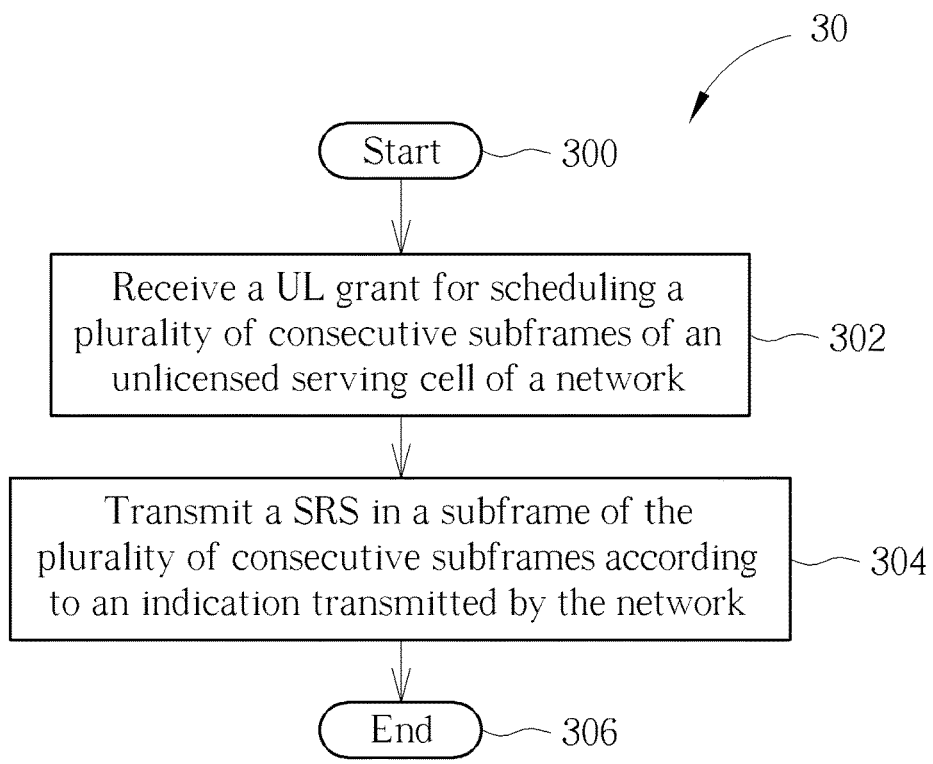
FIG. 3 is a flowchart of a process according to an example of the present invention.

FIG. 3 is a flowchart of a process 30 according to an example of the present invention. The process 30 may be utilized in a communication device shown in FIG. 1, to handle a UL transmission. The process 30 may be compiled into the program code 214 and includes the following steps:

Step 300: Start.

Step 302: Receive a UL grant for scheduling a plurality of consecutive subframes of an unlicensed serving cell of a network.

Step 304: Transmit a sounding reference signal (SRS) in a subframe of the plurality of consecutive subframes according to an indication transmitted by the network.

Step 306: End.

According to the process 30, the communication device may receive a UL grant for scheduling a plurality of consecutive subframes (e.g., consecutive subframes) of an unlicensed serving cell of a network. Then, the communication device may transmit a SRS in a subframe of the plurality of consecutive subframes according to an indication transmitted by the network. That is, both the transmission of the SRS and where to transmit the SRS are scheduled (e.g., indicated) by the network. Thus, interference occurred due to uncertainty of resources of the unlicensed serving cell can be mitigated according to the above arrangement of the SRS. As a result, the transmission can be performed completely and correctly.

Realization of the process 30 is not limited to the above description. The following examples may be applied for realizing the process 30.

In one example, the subframe may be an edge subframe of the plurality of consecutive subframes. Further, the edge subframe may be a first subframe (i.e., beginning subframe) of the plurality of consecutive subframes, or may be a last subframe (i.e., ending subframe) of the plurality of consecutive subframes. In one example, a number of the plurality of consecutive subframes may be 2, 3 or 4. That is, possible numbers of the consecutive subframes may be predetermined. In one example, the communication device may perform a listen before talk (LBT) (i.e., clear channel assessment (CCA)) on the unlicensed serving cell after receiving the UL grant, and may obtain a result indicating a clear channel according to the LBT. Then, the communication device may transmit the SRS in the subframe according to the result and the indication. That is, whether the subframe can be used for transmitting the SRS is determined according both the LBT performed by the communication device and the indication from the network. The communication device may further transmit data in the plurality of consecutive subframes according to the result.

Figure 4:
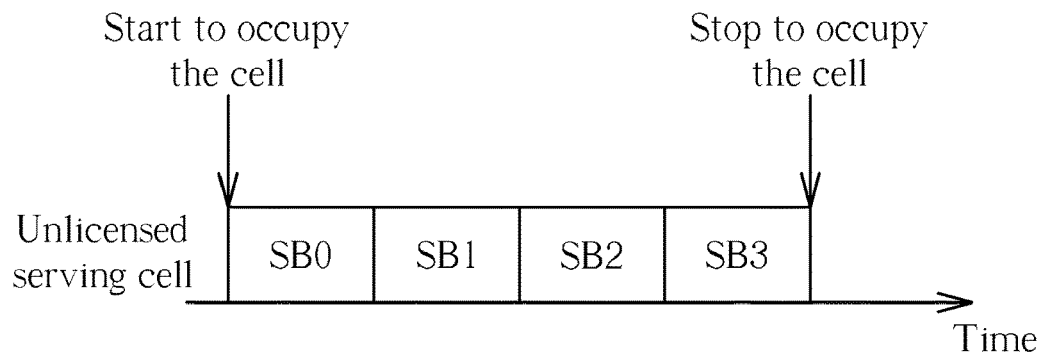
FIG. 4 is a schematic diagram of arrangement of a SRS according to an example of the present invention.

FIG. 4 is a schematic diagram of arrangement of a SRS according to an example of the present invention. First, the communication device receives a UL grant from a network, and the UL grant schedules 4 subframes SB0-SB3 of an unlicensed serving cell of the network to the communication device. Then, the communication device performs a LBT to check whether UL resource(s) of the unlicensed serving cell is not occupied by other device(s). The communication device may transmit a SRS in one of the subframes SB0-SB3, if a result of the LBT indicates that the subframes SB0-SB3 are clear. According to the above description, the communication device may transmit the SRS in the subframe SB0, or may be transmit the SRS in the subframe SB3. The decision may be made according to a choice of the communication device or according to an indication from the network, and is not limited herein.

Figure 5:
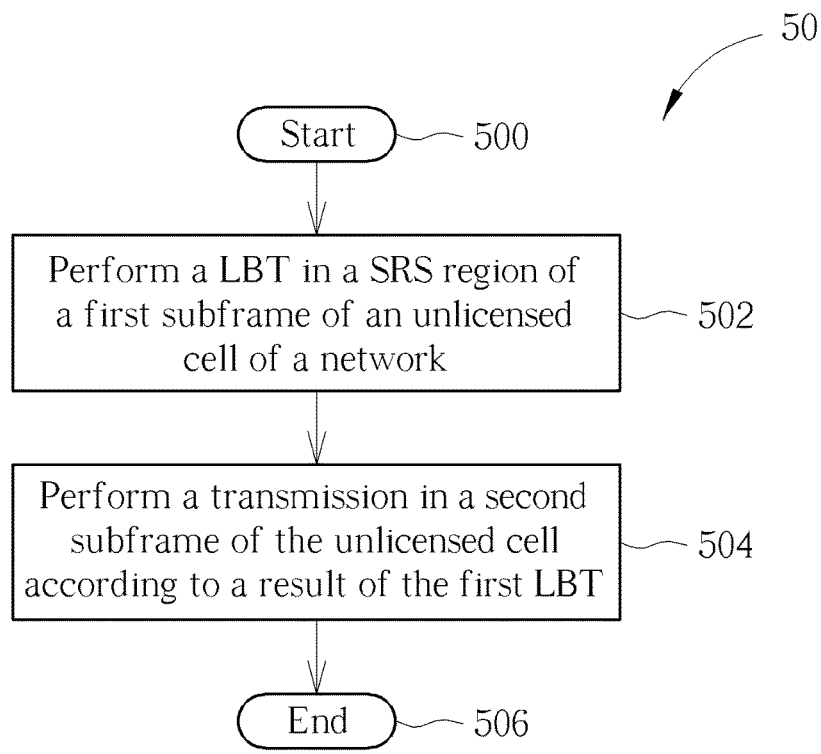
FIG. 5 is a flowchart of a process according to an example of the present invention.

FIG. 5 is a flowchart of a process 50 according to an example of the present invention. The process 50 may be utilized in a communication device shown in FIG. 1, to handle a UL transmission. The process 50 may be compiled into the program code 214 and includes the following steps:

Step 500: Start.

Step 502: Perform a LBT in a SRS region of a first subframe of an unlicensed cell of a network.

Step 504: Perform a transmission in a second subframe of the unlicensed cell according to a result of the first LBT.

Step 506: End.

According to the process 50, the communication device may perform a LBT in a SRS region of a first subframe of an unlicensed cell of a network. Then, the communication device may perform a transmission in a second subframe of the unlicensed cell according to a result of the first LBT. Note that the first subframe and the second subframe may be the same subframe or different subframes. That is, the communication device determines whether to perform the transmission according to whether the channel is clear (i.e., not occupied). Thus, interference occurred due to uncertainty of resources of the unlicensed serving cell can be mitigated according to the above arrangement of the SRS. As a result, the transmission can be performed on the unlicensed serving cell completely and correctly.

Realization of the process 50 is not limited to the above description. The following examples may be applied for realizing the process 50.

In one example, the communication device may perform a second LBT in a third subframe of the unlicensed cell of the network. Then, the communication device may perform the transmission in the first subframe according to the result of the first LBT and a result of the second LBT. That is, the communication device determines whether to perform the transmission according to the results of both the first subframe and the third subframe. In one example, the third subframe may be a neighboring subframe before the first subframe. In one example, the second LBT may be performed according to a SRS configuration. Similarly, the first LBT may be performed according to a SRS configuration. In one example, the communication device may transmit a reservation signal in the first subframe to occupy the first subframe, if the result of the first LBT indicates that the first subframe is a clear channel. That is, the reservation signal may be used for notifying other communication devices or the network that the first subframe is currently being used.

Figure 6:
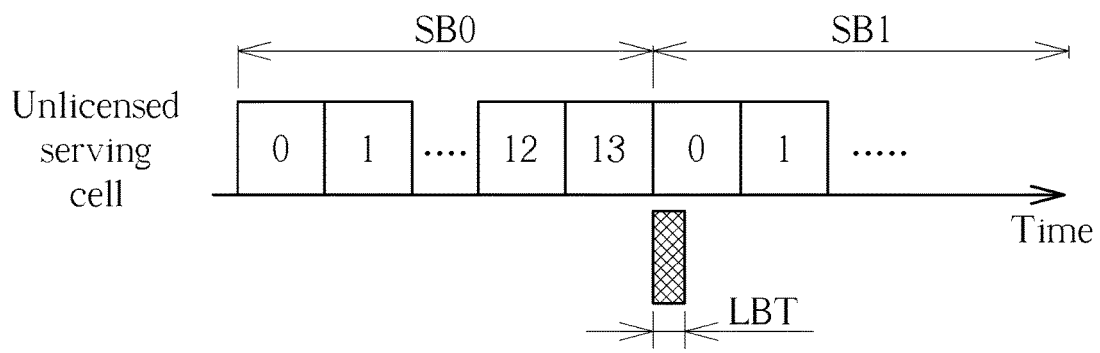
FIG. 6 is a schematic diagram of LBT according to an example of the present invention.

FIG. 6 is a schematic diagram of LBT according to an example of the present invention. Two subframes SB0-SB1 of an unlicensed serving cell are shown in FIG. 6. Each of the subframes SB0-SB1 includes 14 orthogonal frequency division multiplexing (OFDM) symbols, which are indexed from 0 to 13. In the present example, the communication device performs a LBT in a SRS region of the subframe SB1, and determines whether to perform a transmission in the subframe SB1 according to a result of the LBT. The communication device may perform a transmission in the subframe SB1, if the result indicates that the subframe SB1 is a clear channel. The communication device may stop the transmission, if the result indicates that the subframe SB1 is occupied.

Figure 7:
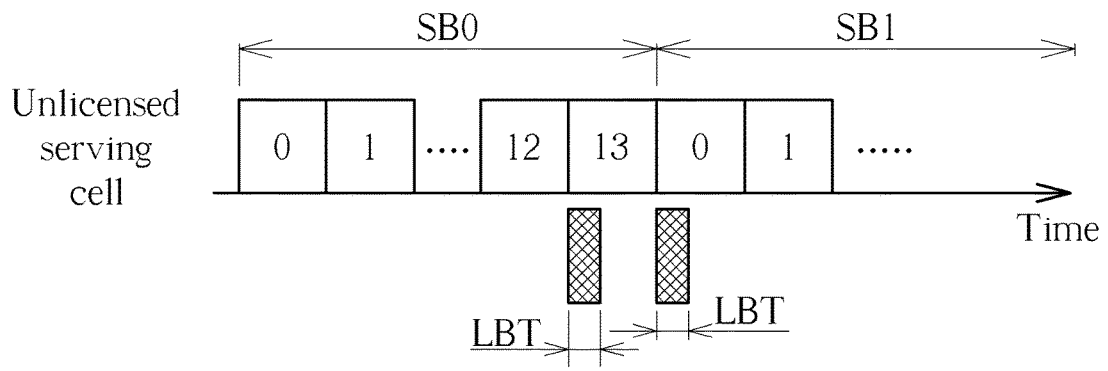
FIG. 7 is a schematic diagram of LBT according to an example of the present invention.

FIG. 7 is a schematic diagram of LBT according to an example of the present invention. Two subframes SB0-SB1 of an unlicensed serving cell are shown in FIG. 7. Each of the subframes SB0-SB1 includes 14 OFDM symbols, which are indexed from 0 to 13. In the present example, the communication device performs a LBT in a SRS region of the subframe SB0, and determines that the subframe SB0 is occupied according to a result of the LBT. After a while, the communication device performs a LBT in a SRS region of the subframe SB1, and determines that the subframe SB1 is a clear channel according to a result of the LBT. That is, the communication device determines whether to perform a transmission in the subframe SB1 according to the results of the LBTs in the subframes SB0-SB1. Similarly, the communication device may perform a transmission in the subframe SB1, if the result indicates that the subframe SB1 is a clear channel. The communication device may stop the transmission, if the result indicates that the subframe SB1 is occupied.

Figure 8:
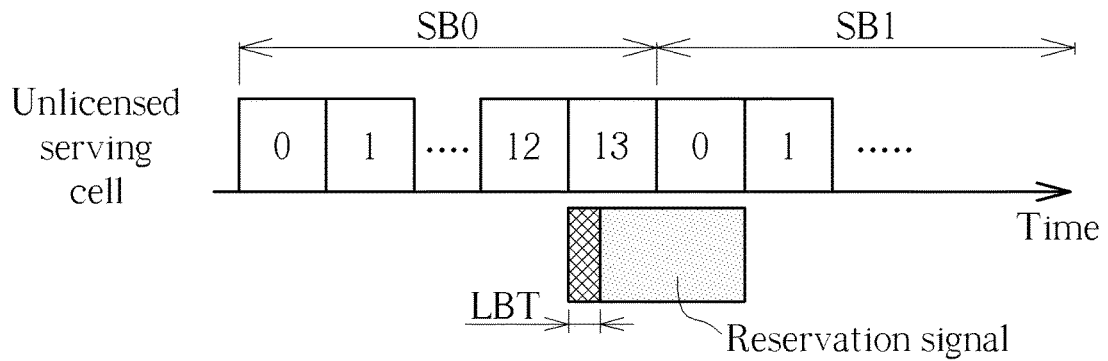
FIG. 8 is a schematic diagram of LBT according to an example of the present invention.

FIG. 8 is a schematic diagram of LBT according to an example of the present invention. Two subframes SB0-SB1 of an unlicensed serving cell are shown in FIG. 8. Each of the subframes SB0-SB1 includes 14 OFDM symbols, which are indexed from 0 to 13. In the present example, the communication device performs a LBT in a SRS region of the subframe SB0, and determines whether to perform a transmission in the subframe SB1 according to a result of the LBT. The communication device may perform a transmission in the subframe SB1, if the result indicates that the subframe SB1 is a clear channel. Accordingly, the communication device may transmit a reservation signal in the subframes SB0-SB1 to occupy the subframes SB0-SB1. The communication device may stop the transmission, if the result indicates that the subframe SB1 is occupied.

Figure 9:
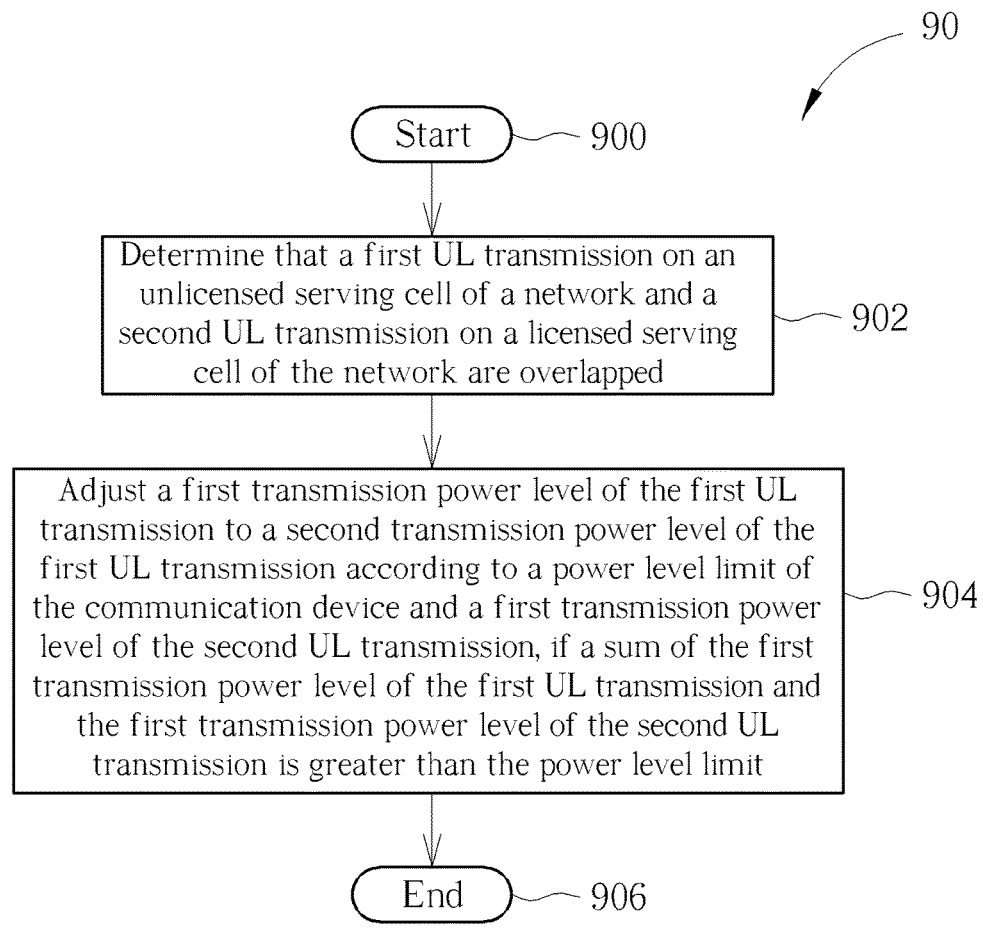
FIG. 9 is a flowchart of a process according to an example of the present invention.

FIG. 9 is a flowchart of a process 90 according to an example of the present invention. The process 90 may be utilized in a communication device shown in FIG. 1, to handle UL power control. The process 90 may be compiled into the program code 214 and includes the following steps:

Step 900: Start.

Step 902: Determine that a first UL transmission on an unlicensed serving cell of a network and a second UL transmission on a licensed serving cell of the network are overlapped.

Step 904: Adjust a first transmission power level of the first UL transmission to a second transmission power level of the first UL transmission according to a power level limit of the communication device and a first transmission power level of the second UL transmission, if a sum of the first transmission power level of the first UL transmission and the first transmission power level of the second UL transmission is greater than the power level limit.

Step 906: End.

According to the process 90, the communication device may determine that a first UL transmission on an unlicensed serving cell of a network and a second UL transmission on a licensed serving cell of the network are overlapped. The unlicensed serving cell and the licensed serving cell may belong to a same eNB or different eNBs. Then, the communication device may adjust a first transmission power level of the first UL transmission to a second transmission power level of the first UL transmission according to a power level limit of the communication device and a first transmission power level of the second UL transmission, if a sum of the first transmission power level of the first UL transmission and the first transmission power level of the second UL transmission is greater than the power level limit. That is, the transmission power level of the first UL transmission is adjusted such that the power level limit can be satisfied, e.g., the total transmission power is not greater than the power level limit. Thus, interference occurred due to uncertainty of resources of the unlicensed serving cell can be mitigated according to the above arrangement of the transmission power levels. As a result, the transmission on the unlicensed serving cell can be performed completely and correctly.

Realization of the process 90 is not limited to the above description. The following examples may be applied for realizing the process 90.

In one example, the communication device may drop a part of the second UL transmission after adjusting the first transmission power level of the first UL transmission, if the power level limit is not satisfied, wherein the part of the second UL transmission is overlapped with the first UL transmission. In one example, the communication device may drop the second UL transmission before adjusting the first transmission power level of the first UL transmission. That is, the first transmission power level of the first UL transmission may be adjusted according to only the power level limit. In one example, the communication device may adjust the first transmission power level of the second UL transmission to a second transmission power level of the second UL transmission according to the power level limit and the second transmission power level of the first UL transmission, if the power level limit is not satisfied. That is, both the transmission power levels of the first UL transmission and the second UL transmission are adjusted for the power level limit to be satisfied. In this situation, a sum of the second transmission power level of the first UL transmission and the second transmission power level of the second UL transmission may not be greater than the power level limit. There are various ways for adjusting a transmission power level. In one example, the first transmission power level of the second UL transmission may be adjusted by using a weight of the second UL transmission. In one example, the first transmission power level of the first UL transmission may be adjusted by using a weight of the first UL transmission. The weights of the first UL transmission and the second UL transmission may be the same or different.

Similarly, according to the process 90, a sum of the second transmission power level of the first UL transmission and the first transmission power level of the second UL transmission may not be greater than the power level limit. In one example, the first UL transmission and the second UL transmission may be partly overlapped, or may be completely overlapped. In one example, the second transmission power level of the first UL transmission may be greater than a predetermined power level. That is, a minimum transmission power level of the first UL transmission is guaranteed. In one example, the first UL transmission may include at least one of a physical UL shared channel (PUSCH), a physical UL control channel (PUCCH), a physical random access channel (PRACH) and a SRS. Similarly, the second UL transmission may include at least one of a PUSCH, a PUCCH, a PRACH and a SRS.

It should be noted that the communication device may need to perform a LBT on the unlicensed serving cell after adjusting the transmission power level. Then, the communication device may perform UL transmission(s) on the unlicensed serving cell according to a result of the LBT.

According to the above description, an example is illustrated as follows. A transmission power level of a SRS on an unlicensed serving cell and a transmission power level of a SRS on a licensed serving cell can be adjusted according to the following equation:

$$w_U P_{SRS,U} + w_L P_{SRS,L} \leq P_{Max}, \ w_U P_{SRS,U} > w_U P_{SRS,Min} \quad \text{(Eq. 1)}$$

where $P_{SRS,U}$ and $_{SRS,L}$ are the transmission power levels of the SRSs on the unlicensed serving cell and the licensed serving cell, respectively. $w_U$ and $W_L$ are weights corresponding to $P_{SRS,U}$ and $P_{SRS,L}$, respectively. $P_{Max}$ is the power level limit, and $P_{SRS,Min}$ is the minimum transmission power level of the SRS on the unlicensed serving cell that is guaranteed. In the equation (Eq. 1), $w_U$ and $w_L$ may be the same (i.e., the transmission power levels are adjusted synchronously), or may be different (i.e., the transmission power levels are adjusted asynchronously). $w_L$ may be adjusted to zero to drop the SRS on the licensed serving cell, before or after adjusting $w_U$. Similarly, $w_U$ may be adjusted to zero to drop the SRS on the unlicensed serving cell, before or after adjusting $w_L$.

An example for multiple SRSs is illustrated as follows. Transmission power levels of SRSs on unlicensed serving cells and transmission power levels of SRSs on licensed serving cells can be adjusted according to the following equation:

$$\Sigma_U w_U P_{SRS,U} + \Sigma_L w_L P_{SRS,L} \leq P_{Max}, \ w_U P_{SRS,U} > P_{SRS,Min}, \ \forall U \quad \text{(Eq. 2)}$$

where $P_{SRS,U}$ are the transmission power levels of the SRSs on the unlicensed serving cells, and $P_{SRS,L}$ are the transmission power levels of the SRSs on the licensed serving cells. $w_U$ and $w_L$ are weights corresponding to $P_{SRS,U}$ and $P_{SRS,L}$ respectively. $P_{Max}$ is the power level limit, and $P_{SRS,Min}$ is the minimum transmission power level of the SRSs on the unlicensed serving cells that is guaranteed. In the equation (Eq. 2), $w_U$ and $w_L$ may be the same (i.e., the transmission power levels are adjusted synchronously), or may be different (i.e., the transmission power levels are adjusted asynchronously). In addition, $w_U$ of the unlicensed serving cells may be the same or may be different, and $w_L$ of the licensed serving cells may be the same or may be different. $w_U$ may be adjusted to zero to drop the SRSs on the unlicensed serving cells, before or after adjusting $w_L$. Similarly, $w_L$ may be adjusted to zero to drop the SRSs on the licensed serving cells, before or after adjusting $w_U$.

Figure 10:
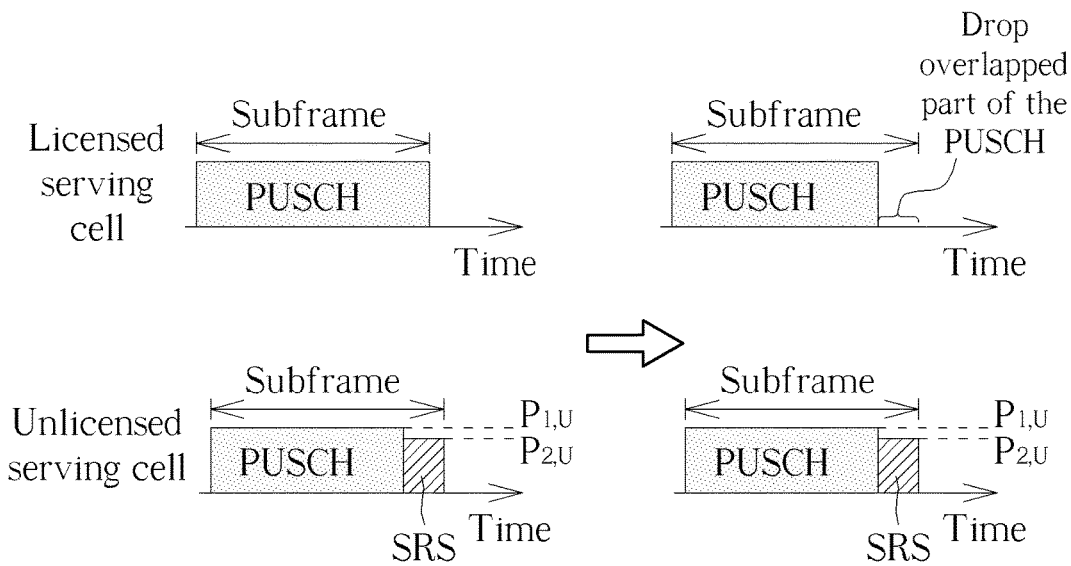
FIG. 10 is a schematic diagram of adjustment of transmission power levels according to an example of the present invention.

FIG. 10 is a schematic diagram of adjustment of transmission power levels according to an example of the present invention. As shown in FIG. 10, a SRS on an unlicensed serving cell and a PUSCH on a licensed serving cell are overlapped (e.g., partly overlapped or completely overlapped). Thus, the communication device may adjust a transmission power level of the SRS from $P_{1,U}$ to $P_{2,U}$ according to a power level limit $P_{MAX}$. Note that $P_{2,U}$ may be the minimum transmission power level of the SRS, but is not limited herein. However, the power level limit is not satisfied, after performing the adjustment of the transmission power level. The communication device decides to drop the overlapped part of the PUSCH on the licensed serving cell. Thus, the power level limit is satisfied, i.e., $P_{2,U} \leq P_{Max}$. Note that the dropping operation may be before the power level adjustment, and the transmission power level of the SRS may not be adjusted accordingly (i.e., maintained at $P_{1,U}$).

Figure 11:
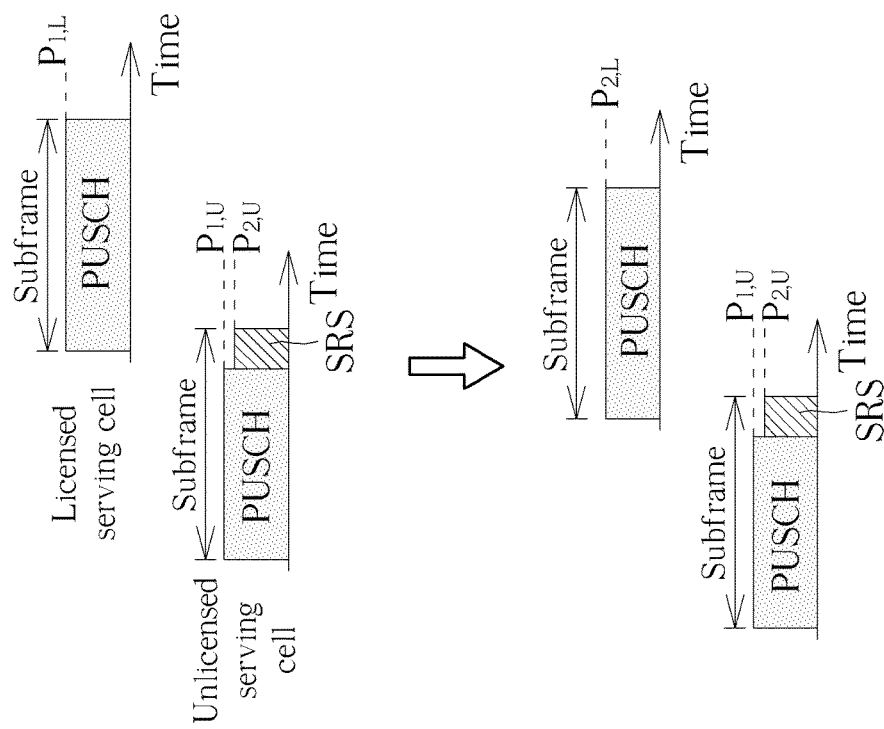
FIG. 11 is a schematic diagram of adjustment of transmission power levels according to an example of the present invention.

FIG. 11 is a schematic diagram of adjustment of transmission power levels according to an example of the present invention. As shown in FIG. 11, a SRS on an unlicensed serving cell and a PUSCH on a licensed serving cell are overlapped (e.g., partly overlapped or completely overlapped). Thus, the communication device may adjust a transmission power level of the SRS from $P_{1,U}$ to $P_{2,U}$ according to a power level limit $P_{MAX}$. Note that $P_{2,U}$ may be the minimum transmission power level of the SRS, but is not limited herein. However, the power level limit is not satisfied, after performing the adjustment of the transmission power level. Thus, the communication device adjusts a transmission power level of the PUSCH from $P_{1,L}$ to $P_{2,L}$. Thus, the power level limit is satisfied, i.e., $P_{2,L} + P_{2,U} \leq P_{Max}$.

Figure 12:
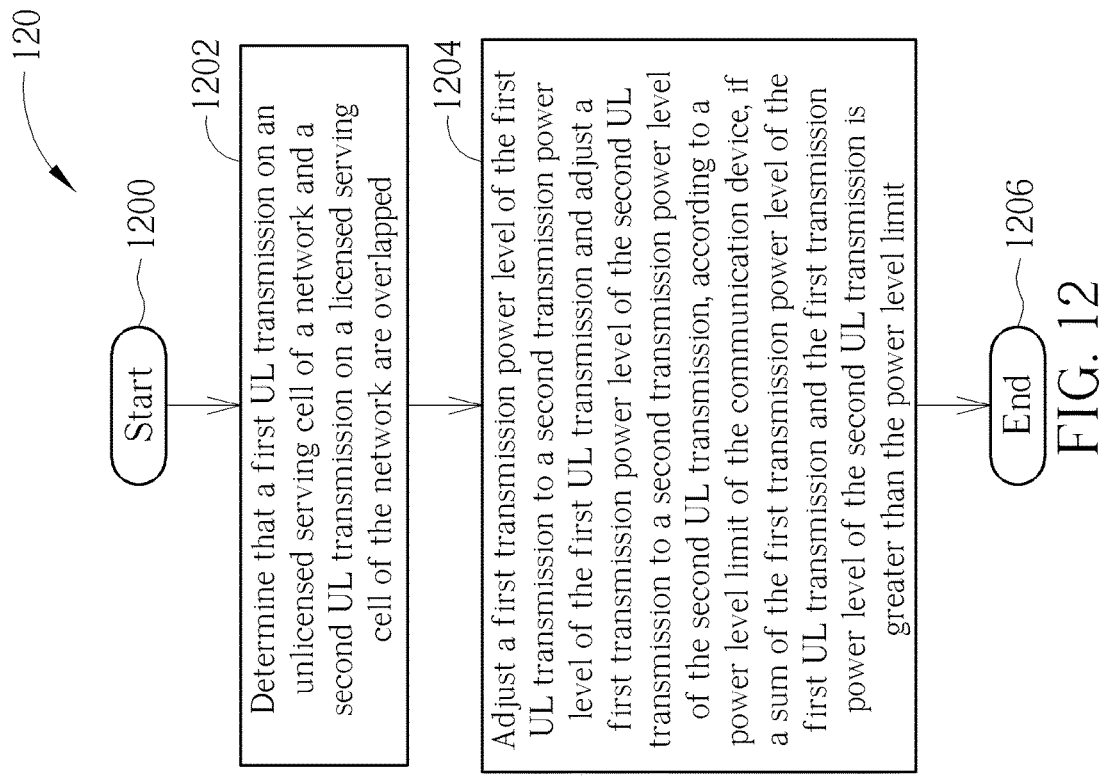
FIG. 12 is a flowchart of a process according to an example of the present invention.

FIG. 12 is a flowchart of a process 120 according to an example of the present invention. The process 120 may be utilized in a communication device shown in FIG. 1, to handle UL power control. The process 120 may be compiled into the program code 214 and includes the following steps:

Step 1200: Start.

Step 1202: Determine that a first UL transmission on an unlicensed serving cell of a network and a second UL transmission on a licensed serving cell of the network are overlapped.

Step 1204: Adjust a first transmission power level of the first UL transmission to a second transmission power level of the first UL transmission and adjust a first transmission power level of the second UL transmission to a second transmission power level of the second UL transmission, according to a power level limit of the communication device, if a sum of the first transmission power level of the first UL transmission and the first transmission power level of the second UL transmission is greater than the power level limit.

Step 1206: End.

According to the process 120, the communication device may determine that a first UL transmission on an unlicensed serving cell of a network and a second UL transmission on a licensed serving cell of the network are overlapped. The unlicensed serving cell and the licensed serving cell may belong to a same eNB or different eNBs. Then, the communication device may adjust a first transmission power level of the first UL transmission to a second transmission power level of the first UL transmission and adjust a first transmission power level of the second UL transmission to a second transmission power level of the second UL transmission, according to a power level limit of the communication device, if a sum of the first transmission power level of the first UL transmission and the first transmission power level of the second UL transmission is greater than the power level limit. That is, both of the power transmission levels of the UL transmissions are adjusted such that the power level limit can be satisfied, e.g., the total transmission power is not greater than the power level limit. Thus, interference occurred due to uncertainty of resources of the unlicensed serving cell can be mitigated according to the above arrangement of the transmission power levels. As a result, the transmission on the unlicensed serving cell can be performed completely and correctly.

Realization of the process 120 is not limited to the above description. The following examples may be applied for realizing the process 120.

In one example, the communication device may drop a part of the second UL transmission after adjusting the first transmission power level of the first UL transmission, if the power level limit is not satisfied, wherein the part of the second UL transmission is overlapped with the first UL transmission. There are various ways for adjusting a transmission power level. In one example, the first transmission power level of the first UL transmission may be adjusted by using a weight of the first UL transmission, and the first transmission power level of the second UL transmission may be adjusted by using a weight of the second UL transmission. The weights of the first UL transmission and the second UL transmission may be the same or different.

In one example, a sum of the second transmission power level of the first UL transmission and the second transmission power level of the second UL transmission may not be greater than the power level limit. In one example, the first UL transmission and the second UL transmission may be partly overlapped, or may be completely overlapped. In one example, the second transmission power level of the first UL transmission may be greater than a predetermined power level. That is, a minimum transmission power level of the first UL transmission is guaranteed. In one example, the first UL transmission may include at least one of a PUSCH, a PUCCH, a PRACH and a SRS. Similarly, the second UL transmission may include at least one of a PUSCH, a PUCCH, a PRACH and a SRS.

According to the above description, an example is illustrated as follows. A transmission power level of a first PUSCH on an unlicensed serving cell and a transmission power level of a second PUSCH on a licensed serving cell can be adjusted according to the following equation:

$$w_U P_{PUSCH,U} + w_L P_{PUSCH,L} \leq P_{Max}, w_U P_{PUSCH,U} > P_{PUSCH,Min} \quad \text{(Eq. 3)}$$

where $P_{PUSCH,U}$ and $P_{PUSCH,L}$ are the transmission power levels of the PUSCHs on the unlicensed serving cell and the licensed serving cells, respectively. $w_U$ and $w_L$ are weights corresponding to $P_{PUSCH,U}$ and $P_{PUSCH,L}$ respectively. $P_{Max}$ is the power level limit, and $P_{PUSCH,Min}$ is the minimum transmission power level of the first PUSCH on the unlicensed serving cell that is guaranteed. In the equation (Eq. 3), $w_U$ and $w_L$ may be the same (i.e., the transmission power levels are adjusted synchronously), or may be different (i.e., the transmission power levels are adjusted asynchronously). $w_U$ maybe adjusted to zero to drop the first PUSCH on the unlicensed serving cell, before or after adjusting $w_L$. Similarly, $w_L$ maybe adjusted to zero to drop the second PUSCH on the licensed serving cell, before or after adjusting $w_U$.

An example for multiple PUSCHs is illustrated as follows. Transmission power levels of PUSCHs on unlicensed serving cells and transmission power levels of PUSCHs on licensed serving cells can be adjusted according to the following equation:

$$\Sigma_U w_U P_{PUSCH,U} + \Sigma_L w_L P_{PUSCH,L} \leq P_{Max}, w_U$$
$$P_{PUSCH,U} > P_{PUSCH,Min}, \forall U \qquad \text{(Eq. 4)}$$

where $P_{PUSCH,U}$ are the transmission power levels of the PUSCHs on the unlicensed serving cells, and $P_{PUSCH,L}$ are the transmission power levels of the PUSCHs on the licensed serving cells. $w_U$ and $w_L$ are weights corresponding to $P_{PUSCH,U}$ and $P_{PUSCH,L}$, respectively. $P_{Max}$ is the power level limit, and $P_{PUSCH,Min}$ is the minimum transmission power level of the PUSCHs on the unlicensed serving cells that is guaranteed. In the equation (Eq. 4), $w_U$ and $w_L$ may be the same (i.e., the transmission power levels are adjusted synchronously), or may be different (i.e., the transmission power levels are adjusted asynchronously). In addition, $w_U$ of the unlicensed serving cells may be the same or may be different, and $w_L$ of the licensed serving cells may be the same or may be different. $w_U$ may be adjusted to zero to drop the PUSCHs on the unlicensed serving cells, before or after adjusting $w_L$. Similarly, $w_L$ may be adjusted to zero to drop the PUSCHs on the licensed serving cells, before or after adjusting $w_U$.

Figure 13:
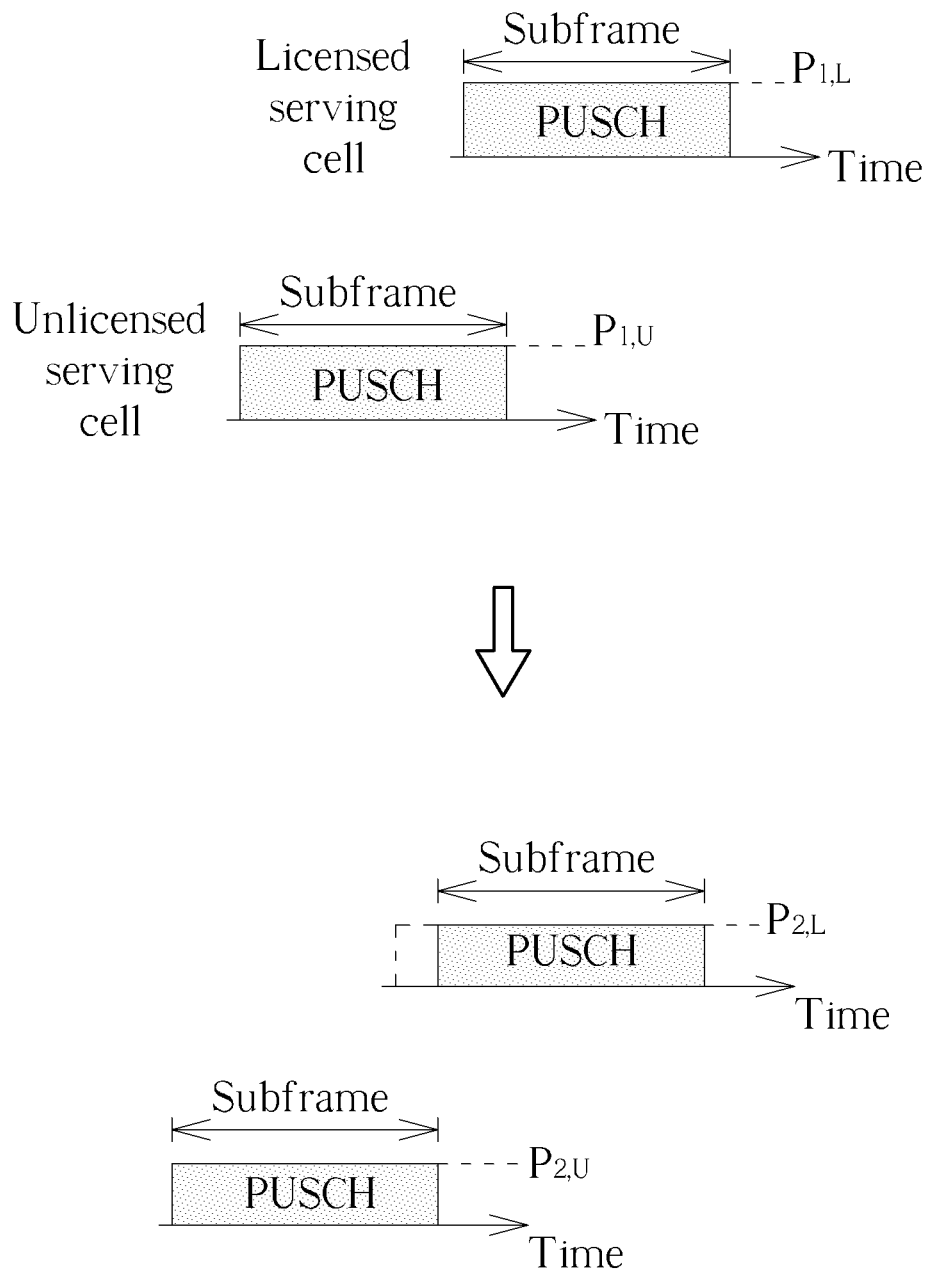
FIG. 13 is a schematic diagram of adjustment of transmission power levels according to an example of the present invention.

FIG. 13 is a schematic diagram of adjustment of transmission power levels according to an example of the present invention. As shown in FIG. 13, a first PUSCH on an unlicensed serving cell and a second PUSCH on a licensed serving cell are overlapped (e.g., partly overlapped or completely overlapped). Thus, the communication device may adjust a transmission power level of the first PUSCH from $P_{1,U}$ to $P_{2,U}$, and may adjust a transmission power level of the second PUSCH from $P_{1,L}$ to $P_{2,L}$ according to a power level limit $P_{MAX}$. However, the power level limit is not satisfied, after performing the adjustments of the transmission power levels. The communication device decides to drop the overlapped part of the second PUSCH on the licensed serving cell. Thus, the power level limit is satisfied, i.e., $P_{2,U} \leq P_{Max}$. Note that the dropping operation may be before the power level adjustment, and the transmission power level of the first PUSCH may not be adjusted accordingly (i.e., maintained at $P_{1,U}$).

Figure 14:
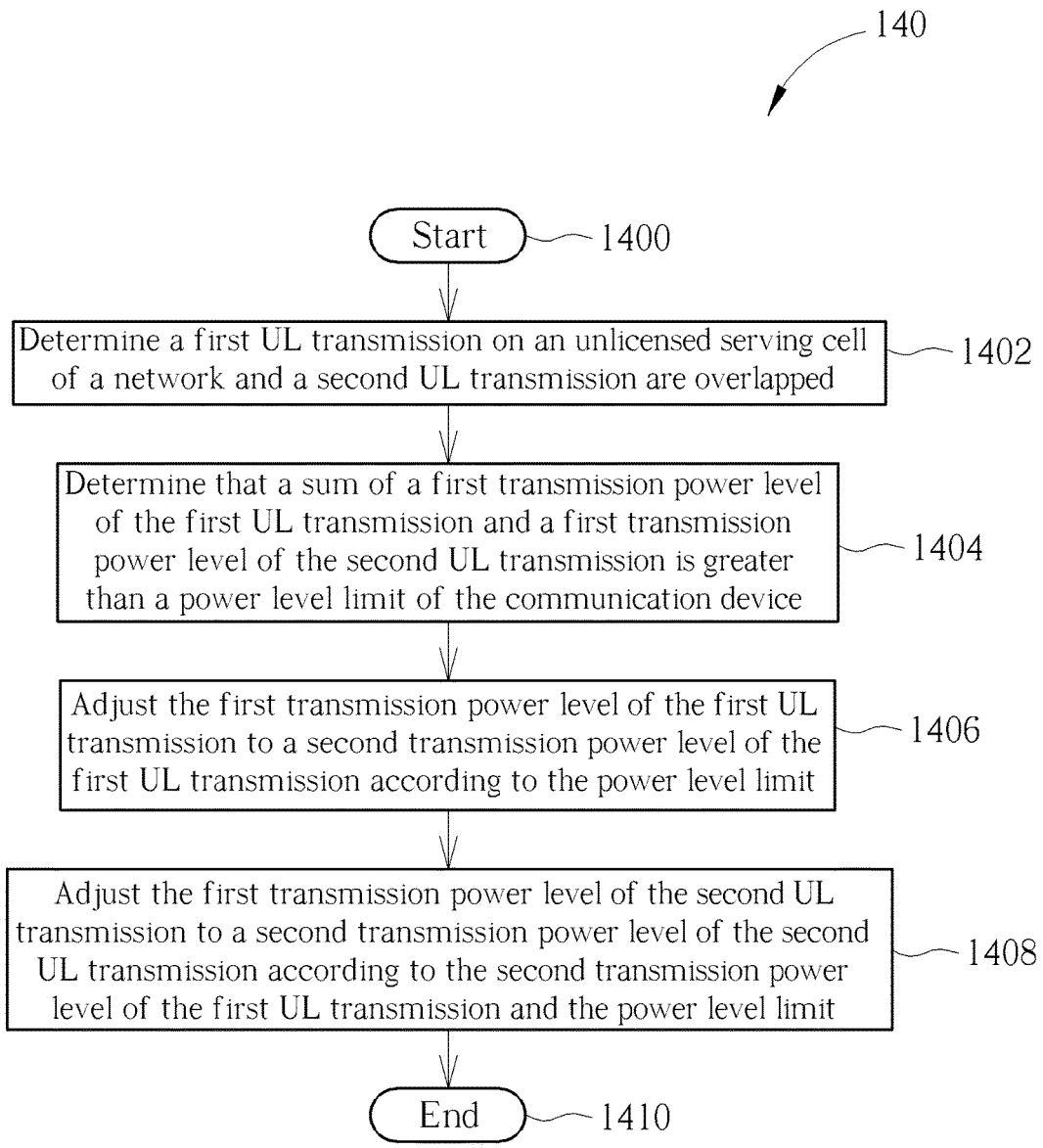
FIG. 14 is a flowchart of a process according to an example of the present invention.

FIG. 14 is a flowchart of a process 140 according to an example of the present invention. The process 140 may be utilized in a communication device shown in FIG. 1, to handle UL power control. The process 140 may be compiled into the program code 214 and includes the following steps:

Step 1400: Start.

Step 1402: Determine a first UL transmission on an unlicensed serving cell of a network and a second UL transmission are overlapped.

Step 1404: Determine that a sum of a first transmission power level of the first UL transmission and a first transmission power level of the second UL transmission is greater than a power level limit of the communication device.

Step 1406: Adjust the first transmission power level of the first UL transmission to a second transmission power level of the first UL transmission according to the power level limit.

Step 1408: Adjust the first transmission power level of the second UL transmission to a second transmission power level of the second UL transmission according to the second transmission power level of the first UL transmission and the power level limit.

Step 1410: End.

According to the process 140, the communication device may determine a first UL transmission on an unlicensed serving cell of a network and a second UL transmission are overlapped. Then, the communication device may determine that a sum of a first transmission power level of the first UL transmission and a first transmission power level of the second UL transmission is greater than a power level limit of the communication device. Accordingly, the communication device may adjust the first transmission power level of the first UL transmission to a second transmission power level of the first UL transmission according to a power level limit of the communication device. The communication device may adjust the first transmission power level of the second UL transmission to a second transmission power level of the second UL transmission according to the second transmission power level of the first UL transmission and the power level limit. That is, a priority of the first UL transmission is greater than a priority of the second UL transmission, and the communication device adjusts the transmission power levels of the channels according to the priorities of the channels. Thus, interference occurred due to uncertainty of resources of the unlicensed serving cell can be mitigated according to the above arrangement of the transmission power levels. As a result, the transmission on the unlicensed serving cell can be performed completely and correctly.

Realization of the process 140 is not limited to the above description. The following examples may be applied for realizing the process 140.

In one example, a sum of the second transmission power level of the first UL transmission and the second transmission power level of the second UL transmission may not be greater than the power level limit. In one example, the communication device may drop the second UL transmission after adjusting the first transmission power level of the second UL transmission, if the power level limit is not satisfied. In one example, the first UL transmission may include at least one of a PUSCH, a PUCCH, a PRACH and a SRS. The second UL transmission may be on a licensed serving cell or the unlicensed serving cell, and may include at least one of a PUSCH, a PUCCH, a PRACH and a SRS.

It should be noted that the communication device may need to perform a LBT on the unlicensed serving cell after adjusting the transmission power level. Then, the communication device may perform UL transmission(s) on the unlicensed serving cell according to a result of the LBT.

In one example, the first UL transmission may include a first PUSCH on the unlicensed serving cell, the second UL transmission may include a second PUSCH on a licensed serving cell. In this situation, the communication device may determine that the first PUSCH, the second PUSCH, and a SRS on the unlicensed serving cell are overlapped. Further, the communication device may adjust a first transmission power level of the SRS to a second transmission power level of the SRS according to the second transmission power level of the first PUSCH, the second transmission power level of the second PUSCH and the power level limit. That is, priorities of the channels from high to low are the first PUSCH, the second PUSCH and the SRS. Similarly, a sum of the second transmission power level of the first PUSCH, the second transmission power level of the second PUSCH and the second transmission power level of the SRS may not be greater than the power level limit. In one example, the communication device may drop the SRS after adjusting the first transmission power level of the SRS, if the power level limit is not satisfied.

On the other hand, the first UL transmission may include a first PUSCH on the unlicensed serving cell, the second UL transmission may include a SRS on the unlicensed serving cell. In this situation, the communication device may determine that the first PUSCH, the SRS, and a second PUSCH on a licensed serving cell are overlapped. Further, the communication device may adjust a first transmission power level of the second PUSCH to a second transmission power level of the second PUSCH according to the second transmission power level of the first PUSCH, the second transmission power level of the SRS and the power level limit. That is, priorities of the channels from high to low are the first PUSCH, the SRS and the second PUSCH channel. Similarly, a sum of the second transmission power level of the first PUSCH, the second transmission power level of the SRS and the second transmission power level of the second PUSCH may not be greater than the power level limit. In one example, the communication device may drop the second PUSCH after adjusting the first transmission power level of the second PUSCH, if the power level limit is not satisfied.

Figure 15:
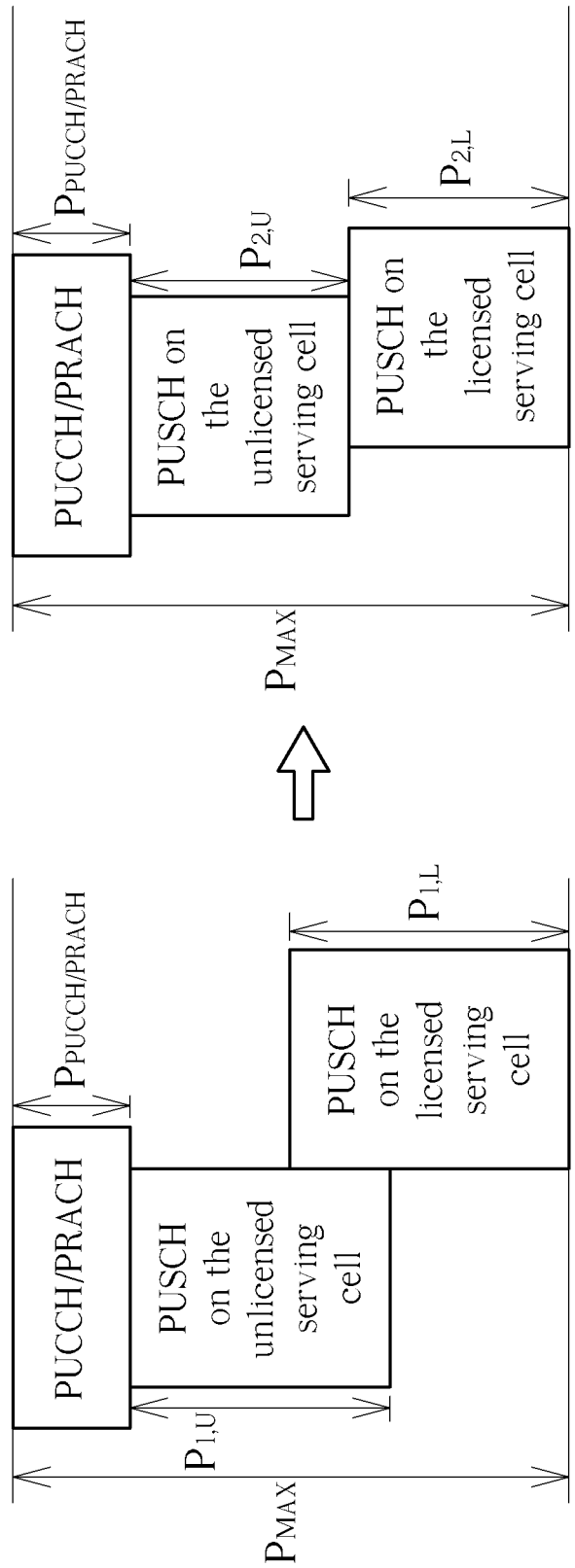
FIG. 15 is a schematic diagram of adjustment of transmission power levels according to an example of the present invention.

FIG. 15 is a schematic diagram of adjustment of transmission power levels according to an example of the present invention. As shown in FIG. 15, a PUCCH/PRACH on a licensed serving cell (or an unlicensed serving cell), a first PUSCH on the unlicensed serving cell, and a second PUSCH on the licensed serving cell are overlapped (e.g., partly overlapped or completely overlapped). Then, according to a power level limit $P_{MAX}$, the communication device may adjust a transmission power level of the first PUSCH from $P_{1,U}$ to $P_{2,U}$ and may adjust a transmission power level of the second PUSCH from $P_{1,L}$ to $P_{2,L}$. As stated in the previous examples, $w_U$ and $w_L$ corresponding to the first PUSCH and the second PUSCH, respectively, may be used for adjusting the transmission power levels. $w_U$ and $w_L$ may be the same, or may be different. Note that a transmission power level of the PUCCH/PRACH $P_{PUCCH/PRACH}$ is also considered, when performing the adjustments of the transmission power levels. Thus, the power level limit is satisfied, i.e., $P_{PUCCH/PRACH}+P_{2,U}+P_{2,L} \leq P_{Max}$. Note that the transmission power level may be maintained (e.g., $P_{1,U}=P_{2,U}$) according to $P_{PUCCH/PRACH}$ and $P_{MAX}$.

Figure 16:
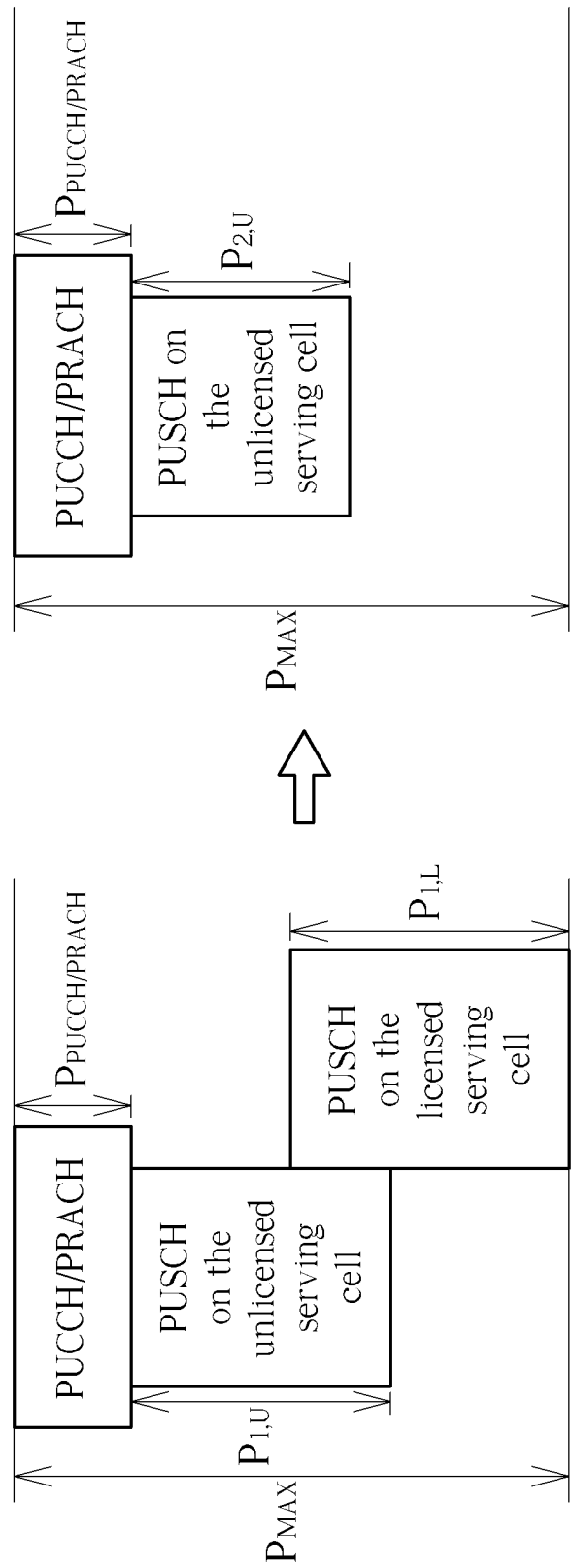
FIG. 16 is a schematic diagram of adjustment of transmission power levels according to an example of the present invention.

FIG. 16 is a schematic diagram of adjustment of transmission power levels according to an example of the present invention. As shown in FIG. 16, a PUCCH/PRACH on a licensed serving cell (or an unlicensed serving cell), a first PUSCH on the unlicensed serving cell, and a second PUSCH on the licensed serving cell are overlapped (e.g., partly overlapped or completely overlapped). Then, according to a power level limit $P_{MAX}$, the communication device may adjust a transmission power level of the first PUSCH from $P_{1,U}$ to $P_{2,U}$ and may adjust a transmission power level of the second PUSCH from $P_{1,L}$ to $P_{2,L}$. As stated in the previous examples, $w_U$ and $w_L$ corresponding to the first PUSCH and the second PUSCH, respectively, may be used for adjusting the transmission power levels. $w_U$ and $w_L$ may be the same, or may be different. Note that a transmission power level of the PUCCH/PRACH $P_{PUCCH/PRACH}$ is also considered, when performing the adjustments of the transmission power levels. However, the power level limit is not satisfied, after performing the adjustments of the transmission power levels. The reason may be that there is a minimum transmission power level of the first PUSCH, e.g., $P_{Min,U}$. The communication device decides to drop the second PUSCH on the licensed serving cell, because a priority of the second PUSCH is lower than a priority of the first PUSCH. Thus, the power level limit is satisfied, i.e., $P_{PUCCH/PRACH}+P_{2,U} \leq P_{Max}$. Note that the transmission power level may be maintained (e.g. $P_{1,U}=P_{2,U}$) according to $P_{PUCCH/PRACH}$ and $P_{MAX}$. Note that the dropping operation may be before the power level adjustment, and the transmission power level of the PUSCH may not be adjusted accordingly (i.e., maintained at $P_{1,U}$).

Figure 17:
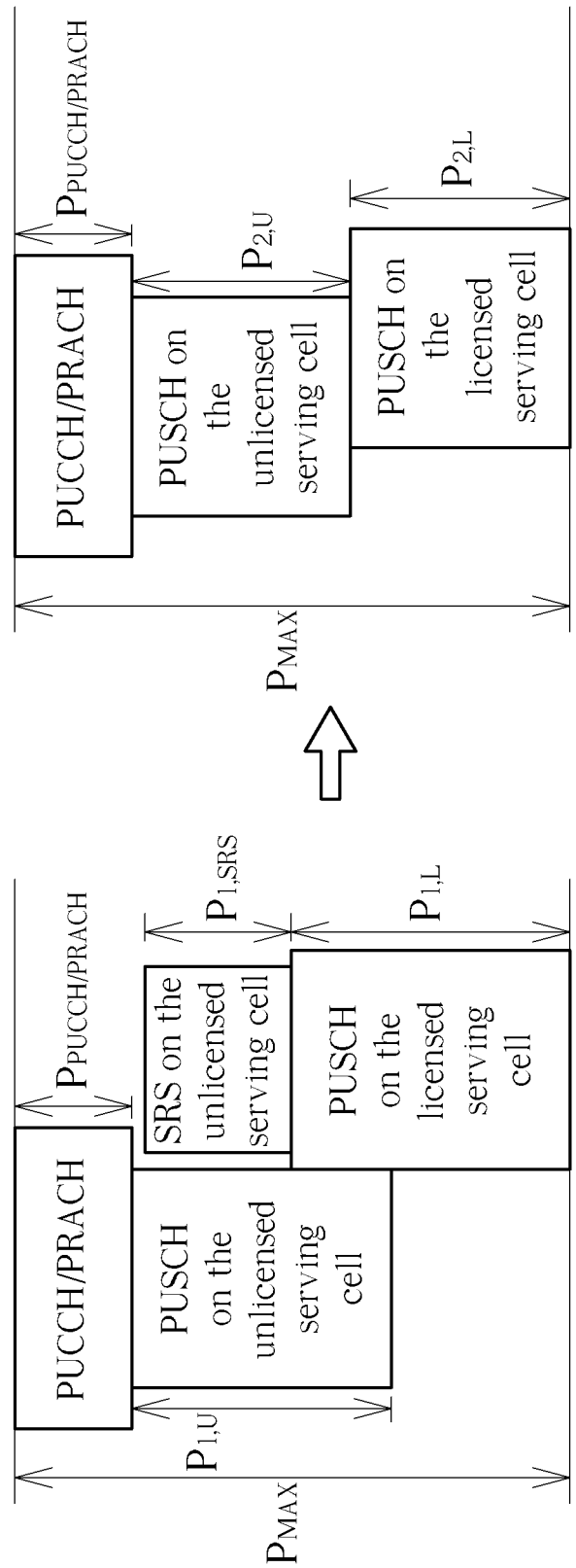
FIG. 17 is a schematic diagram of adjustment of transmission power levels according to an example of the present invention.

FIG. 17 is a schematic diagram of adjustment of transmission power levels according to an example of the present invention. As shown in FIG. 17, a PUCCH/PRACH on a licensed serving cell (or an unlicensed serving cell), a first PUSCH on the unlicensed serving cell, a second PUSCH on the licensed serving cell, and a SRS on the unlicensed serving cell are overlapped (e.g., partly overlapped or completely overlapped). Then, according to a power level limit $P_{MAX}$, the communication device may adjust a transmission power level of the first PUSCH from $P_{1,U}$ to $P_{2,U}$, may adjust a transmission power level of the second PUSCH from $P_{1,L}$ to $P_{2,L}$ and may adjust a transmission power level of the SRS from $P_{1,SRS}$ to $P_{2,SRS}$. As stated in the previous examples, $w_U$, $w_L$ and $w_{SRS}$ corresponding to the first PUSCH, the second PUSCH and the SRS, respectively, may be used for adjusting the transmission power levels. $w_U$, $w_L$ and $w_{SRS}$ may be the same, or may be different. Note that a transmission power level of the PUCCH/PRACH $P_{PUCCH/PRACH}$ is also considered, when performing the adjustments of the transmission power levels. However, the power level limit is not satisfied, after performing the adjustments of the transmission power levels. The reason may be that there is a minimum transmission power level of the first PUSCH, e.g., $P_{Min,U}$. The communication device decides to drop the SRS on the unlicensed serving cell, because a priority of the SRS is lowest among priorities of the UL channels. Thus, the power level limit is satisfied, i.e. $P_{PUCCH/PRACH}+P_{2,L}+P_{2,U} \leq P_{Max}$. Note that the transmission power level(s) may be maintained (e.g. $P_{1,U}=P_{2,U}$ and/or $P_{1,L}=P_{2,L}$) according to $P_{PUCCH/PRACH}$ and $P_{MAX}$.

Figure 18:
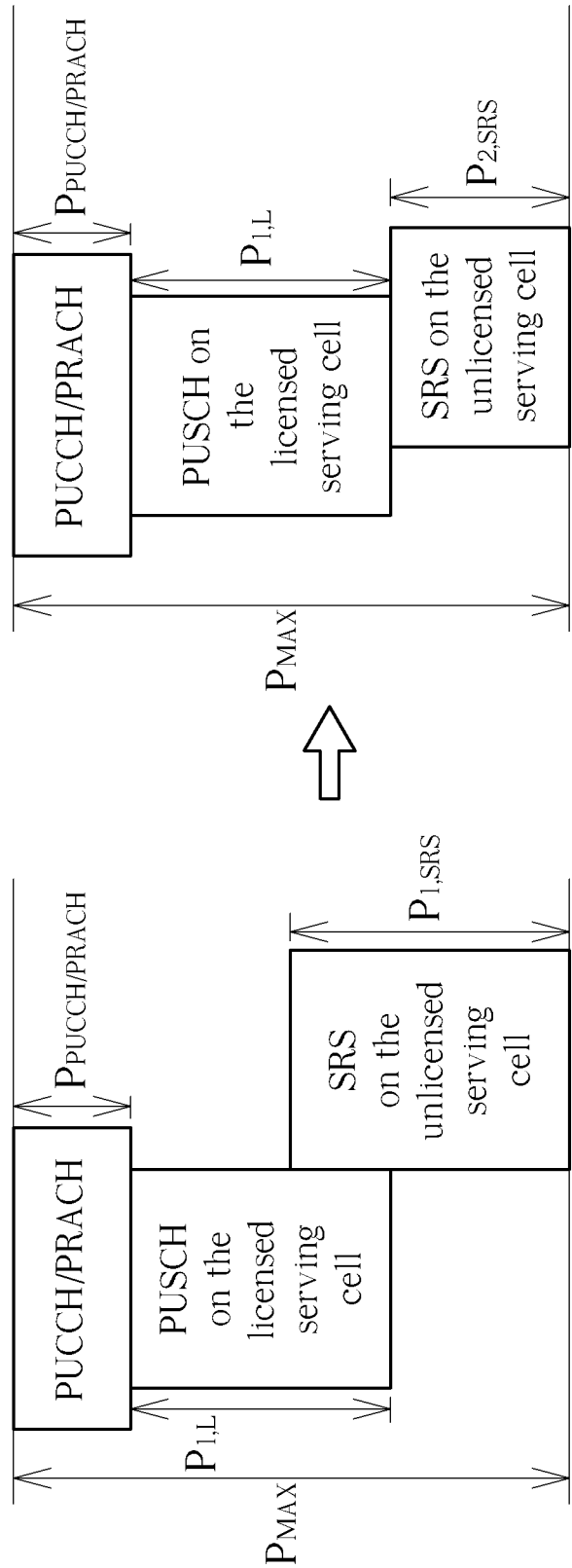
FIG. 18 is a schematic diagram of adjustment of transmission power levels according to an example of the present invention.

FIG. 18 is a schematic diagram of adjustment of transmission power levels according to an example of the present invention. As shown in FIG. 18, a PUCCH/PRACH on a licensed serving cell (or an unlicensed serving cell), a PUSCH on the licensed serving cell, and a SRS on the unlicensed serving cell are overlapped (e.g., partly overlapped or completely overlapped). Then, according to a power level limit $P_{MAX}$, a transmission power level of the PUSCH may be maintained at $P_{1,L}$ and the communication device may adjust a transmission power level of the SRS from $P_{1,SRS}$ to $P_{2,SRS}$. Note that a transmission power level of the PUCCH/PRACH $P_{PUCCH/PRACH}$ is also considered, when performing the adjustments of the transmission power levels. The communication device adjusts the transmission power level of the SRS, because a priority of the SRS is lowest among priorities of the UL channels. Thus, the power level limit is satisfied, i.e., $P_{PUCCH/PRACH}+P_{1,L}+P_{2,SRS} \leq P_{Max}$.

Figure 19:
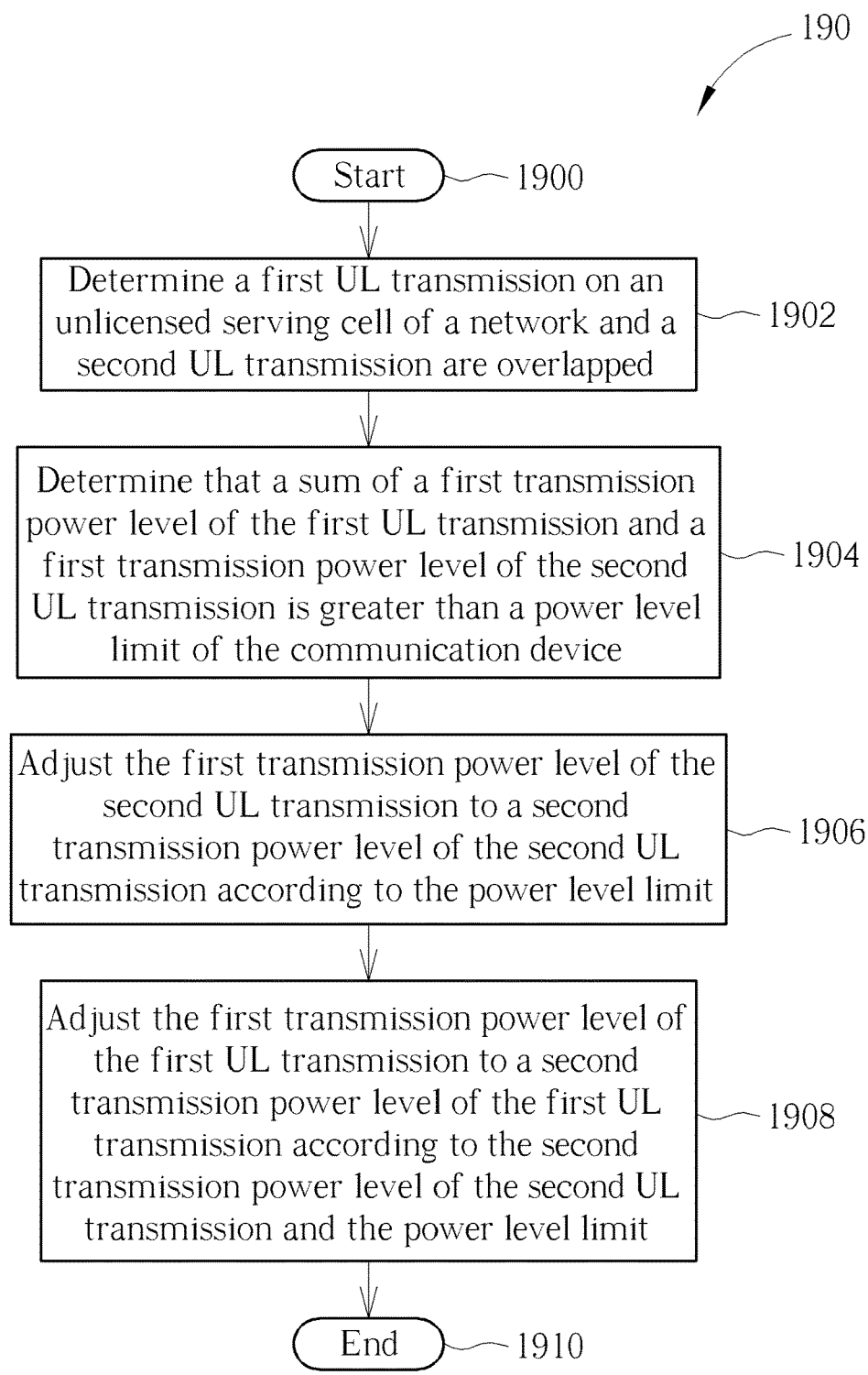
FIG. 19 is a flowchart of a process according to an example of the present invention.

FIG. 19 is a flowchart of a process 190 according to an example of the present invention. The process 190 may be utilized in a communication device shown in FIG. 1, to handle UL power control. The process 190 may be compiled into the program code 214 and includes the following steps:

Step 1900: Start.

Step 1902: Determine a first UL transmission on an unlicensed serving cell of a network and a second UL transmission are overlapped.

Step 1904: Determine that a sum of a first transmission power level of the first UL transmission and a first transmission power level of the second UL transmission is greater than a power level limit of the communication device.

Step 1906: Adjust the first transmission power level of the second UL transmission to a second transmission power level of the second UL transmission according to the power level limit.

Step 1908: Adjust the first transmission power level of the first UL transmission to a second transmission power level of the first UL transmission according to the second transmission power level of the second UL transmission and the power level limit.

Step 1910: End.

According to the process 190, the communication device may determine a first UL transmission on an unlicensed serving cell of a network and a second UL transmission are overlapped. Then, the communication device may determine that a sum of a first transmission power level of the first UL transmission and a first transmission power level of the second UL transmission is greater than a power level limit of the communication device. Accordingly, the communication device may adjust the first transmission power level of the second UL transmission to a second transmission power level of the second UL transmission according to a power level limit of the communication device. The communication device may adjust the first transmission power level of the first UL transmission to a second transmission power level of the first UL transmission according to the second transmission power level of the second UL transmission and the power level limit. That is, a priority of the second UL transmission is greater than a priority of the first UL transmission, and the communication device adjusts the transmission power levels of the channels according to the priorities of the channels. Thus, interference occurred due to uncertainty of resources of the unlicensed serving cell can be mitigated according to the above arrangement of the transmission power levels. As a result, the transmission on the unlicensed serving cell can be performed completely and correctly.

Realization of the process 190 is not limited to the above description. The following examples maybe applied for realizing the process 190.

In one example, a sum of the second transmission power level of the first UL transmission and the second transmission power level of the second UL transmission may not be greater than the power level limit. In one example, the communication device may drop the first UL transmission after adjusting the first transmission power level of the first UL transmission, if the power level limit is not satisfied. In one example, the first UL transmission may include at least one of a PUSCH, a PUCCH, a PRACH and a SRS. The second UL transmission may be on a licensed serving cell or the unlicensed serving cell, and may include at least one of a PUSCH, a PUCCH, a PRACH and a SRS.

Figure 20:
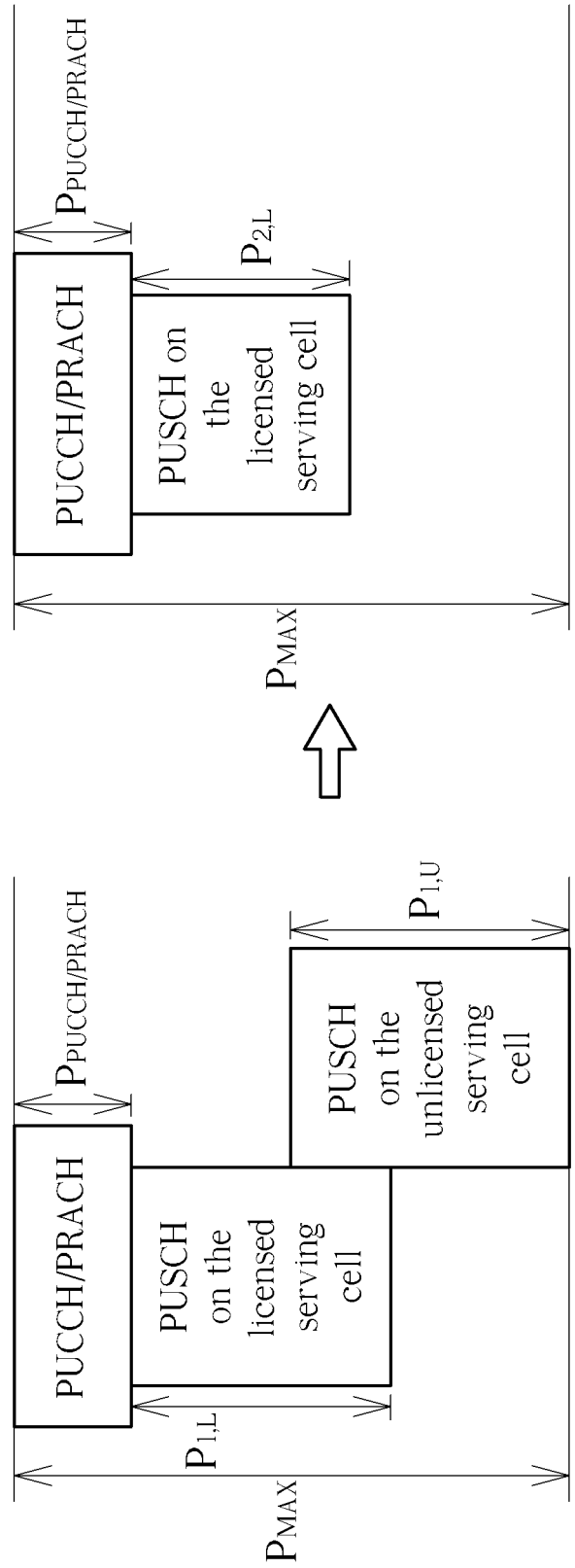
FIG. 20 is a schematic diagram of adjustment of transmission power levels according to an example of the present invention.

FIG. 20 is a schematic diagram of adjustment of transmission power levels according to an example of the present invention. As shown in FIG. 20, a PUCCH/PRACH on a licensed serving cell (or an unlicensed serving cell), a first PUSCH on the unlicensed serving cell, and a second PUSCH on the licensed serving cell are overlapped (e.g., partly overlapped or completely overlapped). Then, according to a power level limit $P_{MAX}$, the communication device may adjust a transmission power level of the second PUSCH from $P_{1,L}$ to $P_{2,L}$ and may adjust a transmission power level of the first PUSCH from $P_{1,U}$ to $P_{2,U}$. As stated in the previous examples, $w_U$ and $w_L$ corresponding to the first PUSCH and the second PUSCH, respectively, may be used for adjusting the transmission power levels. $w_U$ and $w_L$ may be the same, or may be different. Note that a transmission power level of the PUCCH/PRACH $P_{PUCCH/PRACH}$ is also considered, when performing the adjustments of the transmission power levels. However, the power level limit is not satisfied, after performing the adjustments of the transmission power levels. The reason may be that there is a minimum transmission power level of the second PUSCH, e.g., $P_{Min,L}$. The communication device decides to drop the first PUSCH on the unlicensed serving cell, because a priority of the first PUSCH is lower than a priority of the second PUSCH. Thus, the power level limit is satisfied, i.e. $P_{PUCCH/PRACH} + P_{2,L} \leq P_{Max}$. Note that the transmission power level may be maintained (e.g. $P_{1,L} = P_{2,L}$) according to $P_{PUCCH/PRACH}$ and $P_{MAX}$.

It should be noted that, in the above examples (process 30, 50, 90, 120, 140 and/or 190), a first transmission power level and a second transmission power level may be the same, when the first transmission power level is adjusted to the second transmission power level. That is, the same transmission power level may be maintained if needed. In another example, a transmission power level may be adjusted to zero to realize a dropping operation. In addition, "overlapped" may be referred to "partly overlapped" or "completely overlapped". An abovementioned problem may occur in the same subframe or different subframes. A UL channel with a higher priority means that a transmission power level of the UL channel should be greater than a lower bound or should not be adjusted.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides device and a method for handling UL power control. Interference occurred due to uncertainty of resources of an unlicensed serving cell can be mitigated according to the present invention. As a result, the transmission on the unlicensed serving cell can be performed completely and correctly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling uplink (UL) power control, comprising:
   a storage unit; and
   a processing means, coupled to the storage unit, wherein the storage unit stores instructions, and the processing means is configured to execute the instructions of:
   determining that a first UL transmission on a first serving cell of a network and a second UL transmission on a second serving cell of the network are overlapped;
   keeping a transmission power level of the first UL transmission and adjusting a first transmission power level of the second UL transmission to a second transmission power level of the second UL transmission, according to a power level limit of the communication device, if a sum of the transmission power level of the first UL transmission and the first transmission power level of the second UL transmission is greater than the power level limit;
   performing the first UL transmission according to the transmission power level of the first UL transmission; and
   performing the second UL transmission according to the second transmission power level of the second UL transmission.

2. The communication device of claim 1, wherein the first transmission power level of the second UL transmission is adjusted by using a weight of the second UL transmission.

3. The communication device of claim 1, wherein a sum of the transmission power level of the first UL transmission and the second transmission power level of the second UL transmission is not greater than the power level limit.

4. The communication device of claim 1, wherein the first UL transmission and the second UL transmission are partly overlapped, or are completely overlapped.

5. The communication device of claim 1, wherein the second transmission power level of the second UL transmission is greater than a minimum transmission power level of the second UL transmission.

6. The communication device of claim 1, wherein the first UL transmission comprises at least one of a physical UL shared channel (PUSCH), a physical UL control channel (PUCCH), a physical random access channel (PRACH) and a sounding reference signal (SRS).

7. The communication device of claim 1, wherein the second UL transmission comprises at least one of a PUSCH, a PUCCH, a PRACH and a SRS.

8. The communication device of claim 1, wherein the first serving cell is a licensed serving cell.

9. The communication device of claim 1, wherein the second serving cell is an unlicensed serving cell.

10. The communication device of claim 1, wherein the first serving cell and the second serving cell belong to different evolved Node-Bs (eNBs).

11. A method of handling uplink (UL) power control, comprising steps of:
    determining that a first UL transmission on a first serving cell of a network and a second UL transmission on a second serving cell of the network are overlapped;
    keeping a transmission power level of the first UL transmission and adjusting a first transmission power level of the second UL transmission to a second transmission power level of the second UL transmission, according to a power level limit of a communication device, if a sum of the transmission power level of the first UL transmission and the first transmission power level of the second UL transmission is greater than the power level limit;
    performing the first UL transmission according to the transmission power level of the first UL transmission; and
    performing the second UL transmission according to the second transmission power level of the second UL transmission.

12. The method of claim 11, wherein the first transmission power level of the second UL transmission is adjusted by using a weight of the second UL transmission.

13. The method of claim 11, wherein a sum of the transmission power level of the first UL transmission and the second transmission power level of the second UL transmission is not greater than the power level limit.

14. The method of claim 11, wherein the first UL transmission and the second UL transmission are partly overlapped, or are completely overlapped.

15. The method of claim 11, wherein the second transmission power level of the second UL transmission is greater than a minimum transmission power level of the second UL transmission.

16. The method of claim 11, wherein the first UL transmission comprises at least one of a physical UL shared channel (PUSCH), a physical UL control channel (PUCCH), a physical random access channel (PRACH) and a sounding reference signal (SRS).

17. The method of claim 11, wherein the second UL transmission comprises at least one of a PUSCH, a PUCCH, a PRACH and a SRS.

18. The method of claim 11, wherein the first serving cell is a licensed serving cell.

19. The method of claim 11, wherein the second serving cell is an unlicensed serving cell.

20. The method of claim 11, wherein the first serving cell and the second serving cell belong to different evolved Node-Bs (eNBs).

* * * * *

UNITED STATES PATENT AND TRADEMARK OFFICE
CERTIFICATE OF CORRECTION

PATENT NO. : 10,477,486 B2  
APPLICATION NO. : 16/299153  
DATED : November 12, 2019  
INVENTOR(S) : Chien-Min Lee Page 1 of 1

It is certified that error appears in the above-identified patent and that said Letters Patent is hereby corrected as shown below:

On the Title Page

Item (63), correct the Pat. No. from "10,215,132" to --10,251,132--.

Signed and Sealed this
Fourteenth Day of January, 2020

Andrei Iancu
*Director of the United States Patent and Trademark Office*